United States Patent
Van Doremaele et al.

(10) Patent No.: US 8,957,170 B2
(45) Date of Patent: Feb. 17, 2015

(54) TI CATALYST SYSTEMS COMPRISING SUBSTITUTED CYCLOPENTADIENYL, AMIDINE AND DIENE LIGAND

(75) Inventors: Gerardus Henricus Josephus Van Doremaele, Sittard (NL); Martin Alexander Zuideveld, Kelmis (BE); Philip Mountford, Oxford (GB); Alex Heath, Stoke-on-Trent (GB); Richard T. W Scott, Gala Shiels (GB)

(73) Assignee: LANXESS Deutschland GmbH, Cologne (DE)

( * ) Notice: Subject to any disclaimer, the term of this patent is extended or adjusted under 35 U.S.C. 154(b) by 301 days.

(21) Appl. No.: 13/517,267

(22) PCT Filed: Dec. 21, 2010

(86) PCT No.: PCT/EP2010/070344
§ 371 (c)(1),
(2), (4) Date: Feb. 8, 2013

(87) PCT Pub. No.: WO2011/076775
PCT Pub. Date: Jun. 30, 2011

(65) Prior Publication Data
US 2013/0131296 A1 May 23, 2013

(30) Foreign Application Priority Data
Dec. 21, 2009 (EP) .................... 09180137

(51) Int. Cl.
| C08F 4/642 | (2006.01) |
| C08F 4/643 | (2006.01) |
| C08F 4/6592 | (2006.01) |
| C08F 210/16 | (2006.01) |
| C08F 210/18 | (2006.01) |
| C08F 4/76 | (2006.01) |
| C08F 4/659 | (2006.01) |

(52) U.S. Cl.
CPC ............ *C08F 4/76* (2013.01); *C08F 210/18* (2013.01); *C08F 4/6592* (2013.01); *C08F 4/65908* (2013.01); *C08F 4/65912* (2013.01); *C08F 2410/01* (2013.01); *C08F 2420/04* (2013.01); *Y10S 526/943* (2013.01)
USPC .......... 526/161; 526/133; 526/160; 526/165; 526/348; 526/943; 502/103; 502/152; 502/167

(58) Field of Classification Search
CPC ............ C08F 4/65908; C08F 4/65912; C08F 4/6592; C08F 210/16; C08F 210/18
USPC .......... 502/103, 152, 167; 526/133, 160, 161, 526/165, 348, 943
See application file for complete search history.

(56) References Cited

U.S. PATENT DOCUMENTS

| 6,486,276 B1 * | 11/2002 | Wang et al. .................... 526/133 |
| 6,528,671 B1 | 3/2003 | Nabika |
| 7,956,140 B2 | 6/2011 | Ijpeij et al. |
| 2003/0109730 A1 * | 6/2003 | Nabika ........................... 556/9 |
| 2009/0012246 A1 | 1/2009 | Ijpeij et al. |

OTHER PUBLICATIONS

Yasuda, H., "Unique Chemical Behavior and Bonding of Early Transition-Metal-Diene Complexes", American Chemical Society. 1985, vol. 18, pp. 120-126.
Yasuda, H. "1,3-Diene Complexes of Zirconium and Hafnium", Organometallics, 1982, vol. 1, pp. 388-396.
Erker, G., "The Remarkable Features of n4 Conjugated Diene", Advances in Organometallic Chemistry, 1985, vol. 24, pp. 1-39.
Chen, E. "Cocatalysts for Metal-Catalyzed Olefin Polymerization: Activators, Activation Processes, and Structure-Activity Relationships", vol. 100, Jan. 1, 2000, pp. 1391-1434.
Pindado, G. "Novel Zwitterionic Diallylzirconium Complexes: Synthesis, Structure, Polymerization Activity, and Deactivation Pathways", Jan. 1, 1997, vol. 36 No. 21, pp. 2358-2361.
International Search Report from co-pending Application PCT/EP2010 070344, dated Feb. 16, 2011, 3 pages.

* cited by examiner

*Primary Examiner* — Caixia Lu
(74) *Attorney, Agent, or Firm* — Jennifer R. Seng

(57) ABSTRACT

The invention relates to a catalyst system for the polymerization of olefins comprising a metal complex of formula CyLMD and an activating cocatalyst, wherein M is titanium, Cy is a cyclopentadienyl-type ligand, D is a diene, L is an amidinate-containing ligand of formula (1), wherein the amidinate-containing ligand is covalently bonded to the titanium via the imine nitrogen atom, $Sub_1$ is a substituent, which comprises a group 14 atom through which $Sub_1$ is bonded to the imine carbon atom, $Sub_2$ is a substituent, which comprises a nitrogen atom, through which $Sub_2$ is bonded to the imine carbon atom, and Cy is a mono- or polysubstituted cyclopentadienyl-type ligand, wherein the one or more substituents of Cy are selected from the group consisting of halogen, hydrocarbyl, silyl and germyl residues, optionally substituted with one or more halogen, amido, phosphido, alkoxy, or aryloxy residues. The invention further relates to a process for the preparation of a polymer comprising at least one aliphatic or aromatic hydrocarbyl $C_{2-20}$ olefin wherein the at least one aliphatic or aromatic olefin is contacted with the catalyst system of the present invention.

(formula 1)

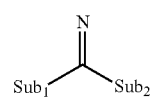

9 Claims, 2 Drawing Sheets

TI CATALYST SYSTEMS COMPRISING SUBSTITUTED CYCLOPENTADIENYL, AMIDINE AND DIENE LIGAND

The invention relates to a new catalyst system for the polymerization of olefins comprising a metal complex of formula CyLMD and an activating cocatalyst, wherein M is titanium, Cy is a cyclopentadienyl-type ligand, L is an imine ligand, D is a diene.

The invention also relates to a process for the preparation of a polymer comprising at least one aliphatic or aromatic hydrocarbyl $C_{2-20}$ olefin.

Such metal complex and process are known from U.S. Pat. No. 6,528,671 B1. This patent relates to a transition metal compound suitable as an addition polymerization catalyst and process comprising a catalyst which is an organometallic complex of a group 4 metal, the organometallic complex containing a phosphinimide ligand.

A disadvantage of the process described in U.S. Pat. No. 6,528,671 B1 is the relatively low activity of the organometallic complex containing a phosphinimide ligand.

The aim of the invention is to provide a new class of catalyst systems comprising imine-type ligands providing highly active catalyst systems for the polymerization of olefins.

This objective is reached by a catalyst system comprising a metal complex of formula CyLMD wherein L is an amidinate-containing ligand of formula 1:

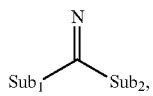

(formula 1)

wherein the amidinate-containing ligand is covalently bonded to the titanium via the imine nitrogen atom, $Sub_1$ is a substituent, which comprises a group 14 atom through which $Sub_1$ is bonded to the imine carbon atom, $Sub_2$ is a substituent, which comprises a nitrogen atom, through which $Sub_2$ is bonded to the imine carbon atom, and Cy is a mono- or polysubstituted cyclopentadienyl-type ligand, wherein the one or more substituents of Cy are selected from the group consisting of halogen, hydrocarbyl, silyl and germyl residues, optionally substituted with one or more halogen, amido, phosphido, alkoxy, or aryloxy residues.

Surprisingly with the catalyst system according to the invention, highly active catalyst systems for the polymerization of olefins are obtained. Another advantage of the catalyst system according to the present invention is its instantaneous catalyst activity upon combination with the activating cocatalyst.

DETAILS OF THE INVENTION

The invention relates to a catalyst system for the polymerization of olefins comprising a metal complex of formula CyLMD and an activating cocatalyst, wherein M is titanium, Cy is a cyclopentadienyl-type ligand, D is a diene, L is an amidinate-containing ligand of formula 1:

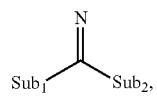

(formula 1)

wherein the amidinate-containing ligand is covalently bonded to the titanium via the imine nitrogen atom, $Sub_1$ is a substituent, which comprises a group 14 atom through which $Sub_1$ is bonded to the imine carbon atom, $Sub_2$ is a substituent, which comprises a nitrogen atom, through which $Sub_2$ is bonded to the imine carbon atom, and Cy is a mono- or polysubstituted cyclopentadienyl-type ligand, wherein the one or more substituents of Cy are selected from the group consisting of halogen, hydrocarbyl, silyl and germyl residues, optionally substituted with one or more halogen, amido, phosphido, alkoxy, or aryloxy residues.

As used herein, the term substituted cyclopentadienyl-type ligand is meant to broadly convey its conventional meaning, namely a substituted ligand having a five-membered carbon ring which is bonded to the metal via a π-type bonding. Thus, the term cyclopentadienyl-type includes cyclopentadienyl, indenyl and fluorenyl. The term mono- or polysubstituted refers to the fact that one or more aromatic hydrogen atoms of the cyclopentadienyl structure have been replaced by one or more other residues. The number of substituents is between 1 and 5 for the cyclopentadienyl ligand, 1 to 7 for the indenyl ligand and 1 to 9 for the fluorenyl ligand. An exemplary list of substituents for a cyclopentadienyl ligand includes the group consisting of $C_{1-10}$ hydrocarbyl radical (which hydrocarbyl substituents are unsubstituted or further substituted), a halogen atom, $C_{1-8}$ alkoxy radical, $C_{6-10}$ aryl or aryloxy radical; an amido radical which is unsubstituted or substituted by up to two $C_{1-8}$ alkyl radicals, a phosphido radical which is unsubstituted or substituted by up to two $C_{1-8}$ alkyl radicals, silyl radicals of the formula —Si—$(R^6)_3$ wherein each $R^6$ is selected from the group consisting of hydrogen, $C_{1-8}$ alkyl or alkoxy radical, $C_{6-10}$ aryl or aryloxy radicals and germanyl radicals of the formula —Ge—$(R^7)_3$ wherein each $R^7$ is selected from the group consisting of hydrogen, $C_{1-8}$ alkyl or alkoxy radical, $C_{6-10}$ aryl or aryloxy radical.

Such cyclopentadienyl-type ligand according to the invention is a mono anionic ligand system that is connected to the titanium atom via an aromatic π-electron. In some cases, the monoanionic cyclopentadienyl coordination is described as an $\eta^5$-bond.

In a preferred embodiment the cyclopentadienyl ligand is penta substituted by methyl groups and in consequence Cy is 1,2,3,4,5-pentamethyl-cyclopentadienyl, $C_5Me_5$, commonly referred to as Cp*.

The characteristic of an imine ligand is defined as a group containing a double bonded nitrogen atom. Non exhaustive examples of imine ligands are ketimine, guanidine, phosphinimine, iminoimidazolidine, (hetero)aryloxyimines, pyrroleimines, indoleimines, imidazoleimines or (hetero)aryloxides, (substituted) pyridin-2-yl-methoxy, (substituted) quinolin-2-yl-methoxy, 8-hydroxyquinoline, 8-aminoquinoline, 8-phosphinoquinoline, 8-thioquinoline, 8-hydroxyquinaldine, 8-aminoquinaldine, 8-phosphinoquinaldine, 8-thioquinaldine and 7-azaindole or indazole and the like. A further example of an imine ligand is the amidine ligand that is represented by formula 1 with $Sub_1$ comprising a group 14 atom through which $Sub_1$ is bonded to the imine carbon atom. $Sub_2$ comprising a nitrogen atom through which $Sub_2$ is bonded to the imine carbon atom.

A preferred embodiment of the invention relates to a catalyst system containing an amidinate-containing ligand L wherein the group 14 atom through which $Sub_1$ is bonded to the imine carbon atom is an aromatic carbon atom. In other words, $Sub_1$ is an aryl residue. Typical examples for such a preferred amidinate-containing ligand are represented by formula 1 with $Sub_1$ being a phenyl or substituted phenyl residue, e.g. naphthyl, 2,6-dimethyl phenyl, 2,6-dichloro phenyl and 2,6-difluorophenyl.

A further embodiment of the invention relates to a catalyst system containing an amidinate-containing ligand L wherein the group 14 atom through which $Sub_1$ is bonded to the imine carbon atom is an aliphatic carbon atom. In other words, $Sub_1$ is an alkyl residue. Typical examples for such a preferred amidinate-containing ligand are represented by formula 1 with $Sub_1$ being a linear, branched or cyclic alkyl residue with 1 to 20 carbon atoms, optionally substituted with halogen, amido, silyl or aryl radicals. Examples for $Sub_1$ are methyl, hexyl, cyclohexyl, iso-propyl, tert-butyl, benzyl, trifluoromethyl, 2,6-dimethyl benzyl, 2,6-difluoro benzyl and 2,6-difluorophenyl.

Another preferred embodiment of the present invention relates to a catalyst system containing an amidinate-containing ligand of formula 1 wherein $Sub_2$ is of the general formula —$NR^4R^5$ with $R^4$ and $R^5$ being individually selected from the group of aliphatic hydrocarbyl, halogenated aliphatic hydrocarbyl, aromatic hydrocarbyl, halogenated aromatic hydrocarbonyl residues, $R^4$ optionally forming a heterocyclic structure with $R^5$ or $Sub_1$. Examples for $Sub_2$ are dimethylamide, diisopropylamide, biscyclohexyl amide, and N-dimethylphenyl N-ethyl amide.

Most preferred examples of the amidinate-containing ligand represented by the formula 1 are based on amidines that can conveniently be prepared by a synthesis as described in EP1730205. The therein described reaction of subsequently adding methylmagnesium bromide (MeMgBr) and an aromatic nitrile (Ar-CN) to a secondary alkyl amine ($R_2NH$) gives high yields of amidine ligands based on commercially available ingredients. Such amidines are represented by the general formula 1 wherein $Sub_1$ is an aryl residue and $Sub_2$ is of the general formula $NR_2$ with each R being individually selected from the group of hydrocarbyl residues optionally forming a heterocyclic structure with each other or $Sub_1$.

Conjugated diene ligands D may be associated with the metal in either an s-trans configuration (π-bound) or in an s-cis configuration (either π-bonded or σ-bonded). In the metal complexes used in the present invention, the diene ligand group, D, is preferably π-bound. Such a bonding type is readily determined by X-ray crystallography or by NMR spectral characterization according to the techniques of Yasuda, et al., Organometallics, 1, 388 (1982), Yasuda, et al., Acc. Chem. Res., 18, 120 (1985), and Erker, et al., Adv. Organomet. Chem., 24, 1 (1985), as well as the references cited therein. By the term "π-complex" is meant both the donation and back acceptance of electron density by the ligand which is accomplished using ligand π-orbitals.

A suitable method of determining the existence of a π-complex in diene containing metal complexes is the measurement of metal-carbon atomic spacings for the carbons of the diene using common X-ray crystal analysis techniques. Measurements of atomic spacings between the metal M and C1, C2, C3, C4 (M-C1, M-C2, M-C3, M-C4, respectively) (where C1 and C4 are the terminal carbons of the 4 carbon conjugated diene group and C2 and C3 are the internal carbons of the 4 carbon conjugated diene group) may be made. If the difference between these bond distances, Δd, using the following formula:

$$\Delta d = [(M-C1+M-C4)-(M-C2+M-C3)]/2$$

is greater than or equal to −0.15 Å, the diene is considered to form a π-complex with M. Such a π-bound diene is considered to be a electronically neutral ligand and the concerned titanium atom is in the formal oxidation state +2.

If Δd is less than −0.15 Å, the diene is considered to form a σ-complex with M and can formally be represented by a metallocyclopentene structure wherein the titanium atom is in the +4 formal oxidation state.

It is to be understood that the complexes according to the present invention may be formed and utilized as a mixture of π-bonded diene complexes and σ-bonded diene complexes.

Inasmuch as the complexes can contain at most one cyclopentadienyl type ligand (Cy), it follows that the diene ligand D cannot comprise a cyclopentadienyl group or other anionic, aromatic π-bonded group.

A preferred embodiment of the present invention consists of a catalyst system, wherein the conjugated diene, is a $C_{4-40}$ diene optionally substituted with one or more groups independently selected from the group consisting of hydrocarbyl, silyl, and halogenated carbyl.

Examples of suitable D moieties include: butadiene, isoprene, 1,3-pentadiene, 1,4-diphenyl-1,3-butadiene; 2,3-diphenyl-1,3-butadiene; 3-methyl-1,3-pentadiene; 1,4-dibenzyl-1,3-butadiene; 2,4-hexadiene; 2,4,5,7-tetramethyl-3,5-octadiene; 2,2,7,7-tetramethyl-3,5-octadiene; 1,4-ditolyl-1,3-butadiene; 1,4-bis(trimethylsilyl)-1,3-butadiene; 2,3-dimethylbutadiene.

A consequence of the preferred π-bonding of the coordinating diene is that the titanium atom of the complex of the present invention with the general formula CyLMD, has the formal valence 2+, since both the ligands Cy and L are monoanionic ligands.

A preferred catalyst system according to the invention comprises an activating cocatalyst selected from the group consisting of borate, borane, or alkylaluminoxane.

Aluminoxanes may be used as activator and/or as a catalyst poison scavenger and/or as an alkylating agent. Most often the aluminoxane is a mixture of different organoaluminum compounds.

The aluminoxane may be of the overall formula: $(R^8)_2AlO$ $(R^8AlO)_mAl(R^8)_2$ wherein each $R^8$ is independently selected from the group consisting of $C_{1-20}$ hydrocarbyl radicals and m is from 0 to 50, preferably $R^8$ is a $C_{1-4}$ radical and m is from 5 to 30. Methylaluminoxane (MAO) in which most of the $R^8$ groups in the compounds of the mixture are methyl is the preferred aluminoxane.

Aluminoxanes are readily available articles of commerce generally as a solution in a hydrocarbon solvent.

The aluminoxane, when employed, is preferably added at aluminum to transition metal (in the catalyst) mole ratio of from 10:1 to 5000:1. Preferred ratios are from 20:1 to 1000:1. Most preferred ratios are from 50:1 to 250:1.

Borate activating cocatalysts can be described by boron containing compounds of the formula $[R^9]^+[B(R^{10})_4]^-$ wherein B is a boron atom, $R^9$ is a cyclic $C_{5-7}$ aromatic cation or a triphenyl methyl cation and each $R^{10}$ is independently selected from the group consisting of phenyl radicals which are unsubstituted or substituted with from 1 to 5 substituents selected from the group consisting of a fluorine atom, a $C_{1-4}$ alkyl or alkoxy radical which is unsubstituted or substituted by fluorine atoms; and a silyl radical of the formula —Si—$(R^{12})_3$; wherein each $R^{12}$ is independently selected from the group consisting of a hydrogen atom and a $C_{1-4}$ alkyl radical.

Further borate activating cocatalysts are described by boron containing compounds of the formula $[(R^{11})_t AH]^+[B(R^{10})_4]^-$ wherein B is a boron atom, H is a hydrogen atom, A is a nitrogen atom or phosphorus atom, t is 2 or 3 and $R^{11}$ is selected from the group consisting of $C_{1-8}$ alkyl radicals, a phenyl radical which is unsubstituted or substituted by up to three $C_{1-4}$ alkyl radicals, or one $R^{11}$ taken together with the nitrogen atom may form an anilinium radical and $R^{10}$ is as defined above.

Borane activating cocatalyst are compounds of the general formula $B(R^{10})_3$ wherein $R^{10}$ is as defined above.

A preferred embodiment of the present invention is a catalyst system wherein the activating cocatalyst is a borane represented by the general formula $BR^1R^2R^3$, wherein B is a boron atom in the trivalent valence state and $R^1$, $R^2$ and $R^3$ are individually selected from the group of halogen atom, hydrocarbyl, halogenated hydrocarbyl, substituted silyl, alkoxy or di substituted amino residue. A most preferred activating cocatalyst is tris pentafluorophenyl borane.

Readily commercially available borate and borane compounds capable of activating the described titanium complexes include: N,N-dimethylanilium-tetrakispentafluorophenyl borate, triphenylmethylium tetrakispentafluorophenyl borate, and trispentafluorophenyl boron.

Above described titanium metal complex and the activating cocatalyst represent the essential compounds required for the highly active polymerization reaction as described by the present invention. It will be understood by the person skilled in the art, that further additives are not excluded from the polymerization process. A non-limiting list of such additives consists of scavengers, stabilizers and carrier materials.

The term scavenger as used in this specification is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when an activator capable of ionizing the titanium metal complex is also present. Aluminum alkyls and aluminoxanes are suitable scavengers. Typical examples are triethylaluminum ($Et_3Al$), trioctylaluminum ($Oct_3Al$), triisobutylaluminum (i-$Bu_3Al$), ($Et_2Al)_2O$, ($Oct_2Al)_2O$, (i-$Bu_2Al)_2O$ and oligomers thereof such as $[(Et_2Al)_2O]_n$ $[(Oct_2Al)_2O]$—, and $[(i-Bu_2Al)_2O]_n$ (with n>1). Optionally the trialkyl aluminium scavengers can be modified by phenolic compounds or other protic heteroatom containing compounds.

An exemplary list of carriers (also called carrier materials or support materials) includes metal oxides (such as silica, alumina, silica-alumina, titania and zirconia); metal chlorides (such as magnesium chloride); clays, polymers or talc.

The preferred support material is silica. In a particularly preferred embodiment, the silica has been treated with an aluminoxane (especially methylaluminoxane or MAO) prior to the deposition of the titanium metal complex. It will be recognized by those skilled in the art that silica may be characterized by such parameters as particle size, pore volume and residual silanol concentration. The pore size and silanol concentration may be altered by heat treatment or calcination.

The residual silanol groups provide a potential reaction site between the aluminoxane and the silica. This reaction may help to "anchor" the aluminoxane to the silica.

As a general guideline, the use of commercially available silicas, such as those sold by W.R. Grace under the trademark Davidson 948 or Davidson 955, are suitable.

The invention further relates to a process for the preparation of a polymer comprising at least one aliphatic or aromatic hydrocarbyl $C_{2-20}$ olefin wherein the at least one aliphatic or aromatic olefin is contacted with the catalyst system of the present invention.

Polymerization process according to this invention may be undertaken in any of the well know olefin polymerization processes including those known as "gas phase", "slurry", "high pressure" and "solution".

The use of a supported catalyst is preferred for gas phase and slurry processes whereas a non-supported catalyst is preferred for the solution process.

The polymerization process according to this invention uses an olefin, e.g. ethylene or propylene and may include other monomers which are copolymerizable therewith (such as other olefins, preferably propylene, butene, hexene or octene, and optionally dienes such as hexadiene isomers, vinyl aromatic monomers such as styrene or cyclic olefin monomers such as norbornene).

The polyethylene polymers which may be prepared in accordance with the present invention typically comprise not less than 60, preferably not less than 70 wt % of ethylene and the balance one or more $C_{4-10}$ alpha olefins preferably selected from the group consisting of 1-butene, 1-hexene and 1-octene. The polyethylene prepared in accordance with the present invention may be linear low density polyethylene having density from about 0.910 to 0.935 g/mL. The process of the present invention is preferably used to prepare polyethylene having a density below 0.910 g/mL—the so called very low and ultra low density polyethylenes.

A preferred embodiment of the present invention is a process wherein the prepared polymer is EPDM. EPDM being the common terminology to describe elastomeric co- and terpolymers of ethylene, propylene and optionally one or more diolefin monomer (diene). Generally, such elastomeric polymers will contain about 40 to about 80 wt % ethylene, preferably about 50 to 75 wt % ethylene and correspondingly from 60 to 20 wt % and preferably from 50 to 25 wt % of propylene respectively. A portion of the monomers, typically the propylene monomer, may be replaced by a non-conjugated diolefin. The diolefin may be present in amounts up to 10 wt % of the polymer although typically is present in amounts from about 3 to 5 wt %. The resulting polymer may have a composition comprising from 40 to 80 wt % of ethylene, from 60 to 20 wt % of propylene and up to 10 wt % of one or more diene monomers to provide 100 wt % of the polymer. Preferred but not limiting examples of the dienes are dicyclopentadiene (DCPD), 1,4-hexadiene (HD), 5-methylene-2-norbornene, 5-ethylidene-2-norbornene (ENB) and 5-vinyl-2-norbornene (VNB). Particularly preferred dienes are ENB and VNB.

The polymers prepared according to the process of the present invention may have a weight average molecular weight of 10,000 to 5,000,000 g/mol. Preferably, the polymers have a weight average molecular weight of 20,000 to 1,000,000 g/mol, more preferably 50,000 to 300,000 g/mol.

The preferred polymerization process of this invention encompasses the use of the novel catalysts system in a medium pressure solution process. As used herein, the term "medium pressure solution process" refers to a polymerization carried out in a solvent for the polymer at an operating temperature from 20 to 150° C. (especially from 40 to 120° C.) and a total pressure of from 3 to 35 bar. Hydrogen may be used in this process to control molecular weight. Optimal catalyst component concentrations are affected by such variables as temperature and monomer concentration but may be quickly optimized by non-inventive tests.

The most preferred process of the present invention is a solution process for the polymerization of ethylene propylene diene elastomers (EPDM). These processes are conducted in the presence of an inert hydrocarbon solvent such as a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphta.

The monomers used in the process according to the invention for the preparation of the polymer may be dissolved/dispersed in the solvent prior to being fed to a reactor. For a gaseous monomer, the monomer may be fed to a reactor so that it will dissolve in the reaction mixture. Prior to mixing, the solvent and monomers are preferably purified to remove potential catalyst poisons such as water or oxygen. The feedstock purification follows standard practices in the art, e.g. molecular sieves, alumina beds and oxygen removal catalysts are used for the purification of monomers. The solvent itself (e.g. methylpentane, cyclohexane, hexane or toluene) is preferably treated in a similar manner.

The feedstock may be heated or cooled prior to feeding to the polymerization reactor. Additional monomers and solvent may be added to a second reactor and the reactor(s) may be heated or cooled.

Generally, the catalyst component and ingredients such as scavenger and activator can be added as separate solutions to the reactor or premixed before adding to the reactor.

The residence time in the polymerization reactor will depend on the design and the capacity of the reactor. Generally the reactors should be operated under conditions to achieve a thorough mixing of the reactants. If two reactors in series are used, it is preferred that from 50 to 95 wt % of the final polymer is polymerized in the first reactor, with the balance being polymerized in the second reactor. It is also possible to use a dual parallel reactor setup. On leaving the reactor the solvent is removed and the resulting polymer is finished in a conventional manner.

It is also within the scope of this invention to use more than two polymerization reactors.

The invention also relates to the polymer obtainable by the process according to the invention.

A further advantage of the polymerization system according to the present invention is the speed of activation of the titanium diene complex upon the addition of the activating cocatalyst. Whereas most of the catalyst systems from the prior art require pre-mixing of the catalyst-cocatalyst system, the catalyst system of the present invention allows the immediate dosing of the titanium complex and the cocatalyst to the reactor without substantial loss of activity of the catalyst system.

FIGURES

Figure 1:
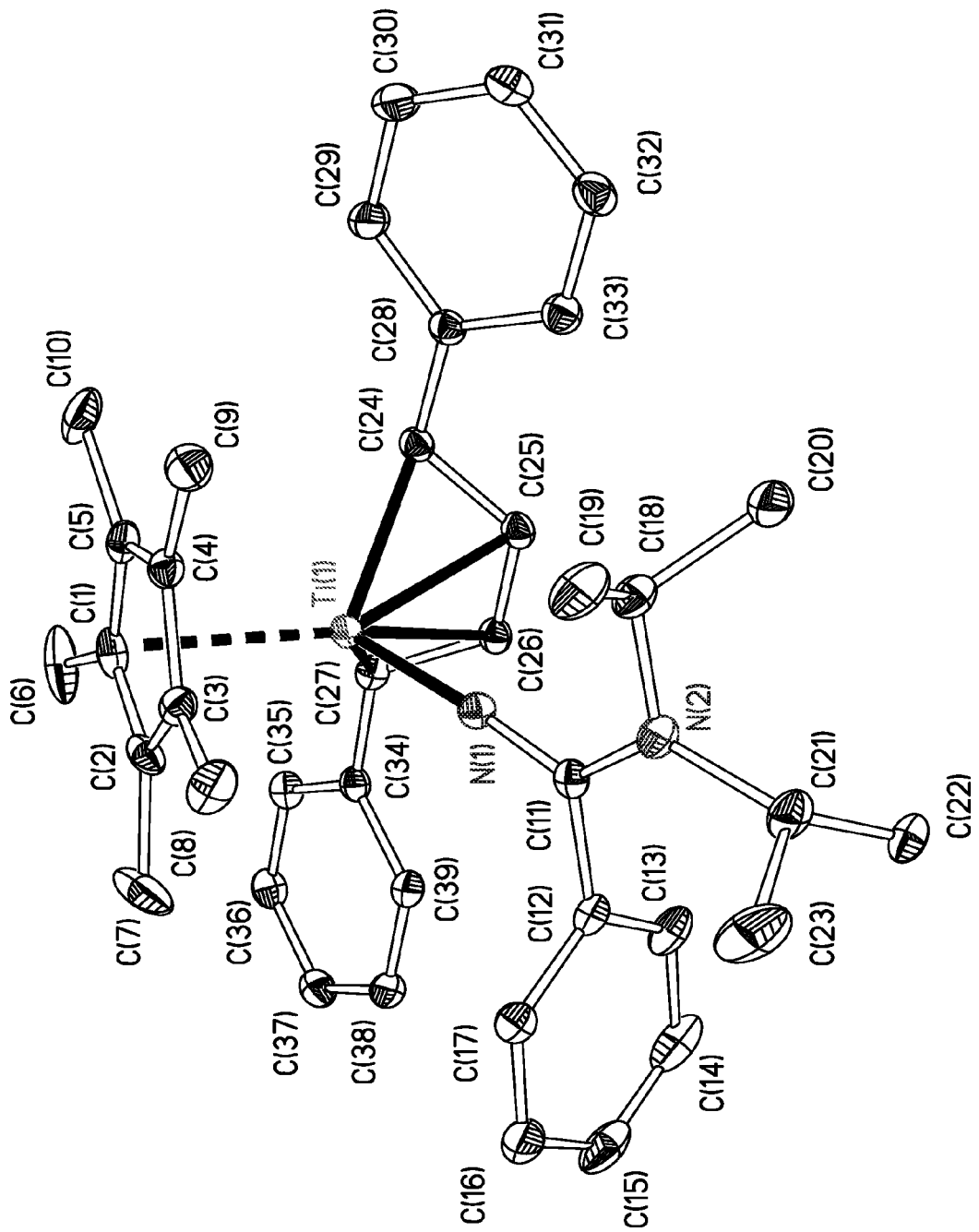
FIG. 1 shows the X-ray structure of Cp*Ti{NC(Ph)NiPr$_2$}(η-1,4-C$_4$H$_4$Ph$_2$)
Figure 2:
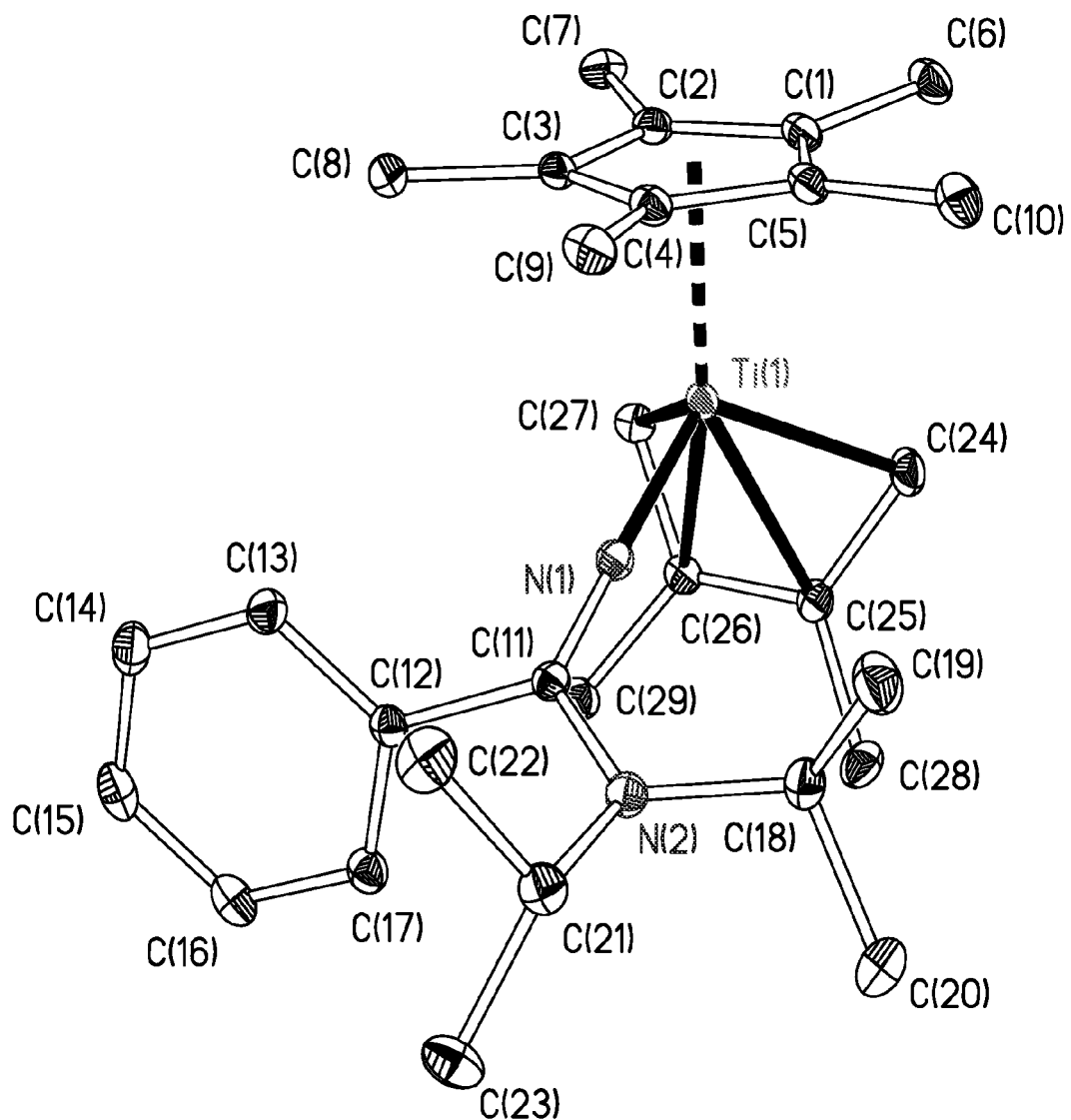
FIG. 2 shows the X-ray structure of Cp*Ti{NC(Ph)NiPr$_2$}(η-2,3-C$_4$H$_4$Me$_2$)

The invention will be elucidated on the basis of the following examples and comparative experiments, without being limited thereto.

Test Methods.

Size Exclusion Chromatography (SEC) coupled to Refractive Index (RI) and Differential Viscometry (DV) detection. (SEC-DV)

Equipment: PL220 (Polymer Laboratories) SEC with PL220 DRI concentration detector and Viscotek 220R viscometry detector.

Detectors are operated in parallel configuration.

Erma solvent degasser ERC-3522

Data processing: Viscotek data processing software, TriSEC 2.7 or higher version Columns: Toyo Soda (TSK) GMHHR-H(S) HT mixed bed (4×)

Calibration: Universal calibration with linear polyethylene (PE) standard (molecular weight 0.4-4000 kg/mol)

Temperature: 145° C.

Flow: 1.0 ml/min

Injection volume: 0.300 ml

Solvent/eluent: Distilled 1,2,4-trichlorobenzene with about 1 g/l of Ionol stabilizer Sample preparation: Dissolving for 4 hours at approx. 150° C.

Filtration through 1.2 micron Ag filter

Sample concentration approx. 1.0 mg/ml

SEC-MALLS was measured with a PL-GPC210 with Wyatt DAWN EOS; 2 PL 20u mixed A columns; Software: Wyatt Astra 4.90;

Eluent: 1,2,4-trichlorobenzene at 160° C.

Intrinsic Viscosity (IV) was measured at 135° C. in decahydronaphthalene as solvent.

NMR ($^1$H, 300 MHz, $^{13}$C 75.7 MHz, and $^{19}$F at 282 MHz) spectra were recorded on a Bruker Avance 300 spectrometer.

Fourier transformation infrared spectroscopy (FT-IR), was used to determine the composition of the copolymers according to the method that is known in the art. The FT-IR measurement gives the composition of the various monomers in weight percent relative to the total composition.

The Mooney viscosity (ML(1+4) 125° C.) and Mooney Stress Relaxation (MSR) were measured according to ISO 289 on a Monsanto Mooney MV2000E.

Part I: Synthesis of Ligands and Compounds

General

All experiments were carried out under nitrogen using Schlenk line techniques. Diethylether an n-hexane were dried by distillation from sodium potassium alloy using benzophenone ketyl as indicator. Toluene was dried by distillation from sodium using benzophenone ketyl as indicator. 2,3-Dimethyl-1,3-butadiene and 1,4-dimethyl-1,3-butadiene were dried over CaH$_2$, distilled under reduced pressure and stored under dinitrogen in a J. Young Teflon valve ampoule. All other reagents were obtained commercially, used as received and stored under argon in J. Young Teflon valve ampoules or under dinitrogen in a dry-box. All other reagents were used as received without further purification.

Cp*Ti{NC(Ph)(N$^i$Pr$_2$}Cl$_2$

Et$_3$N (2.5 mL, 1.83 g, 18.1 mmol) was added to a suspension of Cp*TiCl$_3$ (1.45 g, 5.0 mmol) and N,N-diisopropyl benzamidine (1.00 g, 4.9 mmol) in toluene (50 mL). The mixture was stirred for 16 h. $^1$H-NMR showed 100% conversion to the desired complex, without any detectable amounts of by-products. The mixture was filtered, the residue rinsed with n-hexane and the product was crystallised from this solution at −20° C., giving 1.20 g (54%) crystals. The product was characterized by $^1$H NMR (300 MHz)(CDCl$_3$) δ (ppm): 7.3 (m, 5H), 3.7 (bs, 2H), 1.8 (s, 15H), 1.5 (bs, 6H), 1.1 (bs, 6H) and by $^{13}$C-NMR (75.5 MHz) (CDCl$_3$) δ (ppm) 165.5, 138.1, 129.0, 128.7, 127.2, 52.5 (bs), 48.3 (bs), 21.1 (bs), 12.9.

Cp*Ti{NC(Ph)N$^i$Pr$_2$}(η-2,3-C$_4$H$_4$Me$_2$) (Compound 1)

To a stirring solution of Cp*Ti{NC(Ph)N$^i$Pr$_2$}Cl$_2$ (0.50 g, 1.09 mmol) and 2,3-dimethyl-1,3-butadiene (0.27 g, 3.28 mmol) in toluene (30 mL) at 0° C. was added dropwise two equivalents of $^n$BuLi (1.4 mL, 1.6M in hexane, 2.18 mmol) which resulted in the solution changing colour from orange/red to green. The reaction mixture was allowed to warm slowly to room temperature and was stirred for 20 h. Removal of the volatiles in vacuo afforded a green/blue solid which was extracted into pentane (3×20 mL). After filtration, the pentane solution was concentrated to 20 mL and cooled to 80° C. resulting in crystallisation. The material was isolated and washed with very cold pentane (5 mL) giving the title compound as a green solid (0.27 g, 53%). $^1$H NMR (C$_6$D$_6$, 299.9 MHz, 293 K): 7.06-6.95 (5H, series of overlapping multiplets, C$_6$H$_5$), 3.96 (2H, m, CHMe$_2$, $^3$J=9 Hz), 2.45 (1H, d, η-2,3-C$_4$H$_4$Me$_2$, $^2$J=6 Hz), 2.33 (1H, d, η-2,3-C$_4$H$_4$Me$_2$, $^2$J=9 Hz), 2.19 (3H, s, η-2,3-C$_4$H$_4$Me$_2$), 2.02 (3H, s, η-2,3-C$_4$H$_4$Me$_2$), 1.87 (15H, s, C$_5$Me$_5$), 1.05 (6H, d, CHMe$_2$, $^3$J=6 Hz), 1.00 (6H, d, CHMe$_2$, $^3$J=6 Hz), 0.70 (1H, d, η-2,3-C$_4$H$_4$Me$_2$, $^2$J=6 Hz), 0.58 (1H, d, η-2,3-C$_4$H$_4$Me$_2$, $^2$J=9 Hz) ppm. $^{13}$C NMR (C$_6$D$_6$, 293 K): 164.6 (NC(Ph)N$^i$Pr$_2$), 142.6 (i-C$_6$H$_5$), 128.9 (o- or m-C$_6$H$_5$), 127.9 (p-C$_6$H$_5$), 127.6 (m- or o-C$_6$H$_5$), 126.6 (η-2,3-C$_4$H$_4$Me$_2$ (adjacent to Ti)), 117.6 (C$_5$Me$_5$), 69.6 (CHMe$_2$), 67.7 (CHMe$_2$), 46.8 (η-2,3-C$_4$H$_4$Me$_2$ (vinylic)), 25.2 (η-2,3-C$_4$H$_4$Me$_2$), 24.8 (η-2,3-C$_4$H$_4$Me$_2$), 24.4 (CHMe$_2$), 22.8 (CHMe$_2$), 12.4 (C$_5$Me$_5$) ppm. IR (NaCl plates, Nujol mull, cm$^{-1}$): 1653 (m), 1589 (s), 1541 (w), 1272 (s), 1026 (w), 1157 (m), 800 (w), 783 (m), 702 (s), 653 (w). Anal. found (calcd. for C$_{29}$H$_{44}$N$_2$Ti): C, 74.3 (74.3); H, 9.4 (9.5); N, 6.0 (6.0) %. EI-MS m/z: 468 (5%, [M]$^+$), 386 (35%, [M-2,3-C$_4$H$_4$Me$_2$]$^+$), 223 (10%, [M-2,3-C$_4$H$_4$Me$_2$-Ph-2$^i$Pr]$^+$), 100 (80%, [N$^i$Pr$_2$]$^+$). Single crystals suitable for X-ray diffraction analysis were grown from a pentane solution at room temperature.

Cp*Ti{NC(Ph)N$^i$Pr$_2$}(η-1,4-C$_4$H$_4$Ph$_2$) (Compound 2)

To a stirring solution of Cp*Ti{NC(Ph)N$^i$Pr$_2$}Cl$_2$ (1.00 g, 2.19 mmol) and 1,4-diphenyl-1,3-butadiene (0.45 g, 2.19 mmol) in toluene (30 mL) at 0° C. was added dropwise two equivalents of $^n$BuLi (2.7 mL, 1.6M in hexane, 4.37 mmol) which resulted in the solution changing colour from orange/red to dark brown. The reaction mixture was allowed to warm slowly to room temperature and was stirred for 20 h after which time the opaque solution had acquired a dark green hue. Removal of the volatiles in vacuo afforded a dark green/brown solid which was extracted into pentane (3×20 mL). After filtration, the solvent was removed in vacuo and the resulting dark green solid was isolated. Uncomplexed diene removed by sublimation away from the desired complex (100° C., 10$^{-1}$ mBar, dry ice/acetone cold finger, 8 h) giving 4 as a dark green solid. Yield=0.41 g (39%). $^1$H NMR (Toluene-d$_8$, 299.9 MHz, 253 K): 7.54-6.85 (15H, series of overlapping multiplets, C$_6$H$_5$), 6.28 (1H, m, η-1,4-C$_4$H$_4$Ph$_2$(vinylic)), 5.90 (1H, m, η-1,4-C$_4$H$_4$Ph$_2$(vinylic)), 3.70 (2H, br s, CHMe$_2$), 2.20 (1H, m, η-1,4-C$_4$H$_4$Ph$_2$ (adjacent to Ti)), 1.98 (1H, m, η-1,4-C$_4$H$_4$Ph$_2$(adjacent to Ti)), 1.68 (15H, s, C$_5$Me$_5$), 0.93 (12H, br s, CHMe$_2$) ppm. $^{13}$C NMR (Toluene-d$_8$, 253 K): 156.8 (NC(Ph)N$^i$Pr$_2$), 145.6 (i-C$_6$H$_5$(η-1,4-C$_4$H$_4$Ph$_2$)), 145.3 (i-C$_6$H$_5$(η-1,4-C$_4$H$_4$Ph$_2$)), 140.6 (i-C$_6$H$_5$ (NC(Ph)N$^i$Pr$_2$)), 127.8 (o- or m-C$_6$H$_5$(η-1,4-C$_4$H$_4$Ph$_2$)), 127.7 (o- or m-C$_6$H$_5$ (NC(Ph)N$^i$Pr$_2$)), 127.1 (p-C$_6$H$_5$(η-1,4-C$_4$H$_4$Ph$_2$)), 126.7 (p-C$_6$H$_5$(NC(Ph)N$^i$Pr$_2$)), 125.9 (m- or o-C$_6$H$_5$(η-1,4-C$_4$H$_4$Ph$_2$)), 124.8 (m- or o-C$_6$H$_5$ (NC(Ph)N$^i$Pr$_2$)), 122.6 (η-1,4-C$_4$H$_4$Ph$_2$ (adjacent to Ti)), 122.3 (η-1,4-C$_4$H$_4$Ph$_2$ (adjacent to Ti)), 118.2 (C$_5$Me$_5$), 81.6 (η-1,4-C$_4$H$_4$Ph$_2$ (vinylic)), 80.3 (η-1,4-C$_4$H$_4$Ph$_2$ (vinylic)), 45.1 (CHMe$_2$), 22.3 (CHMe$_2$), 11.1 (C$_5$Me$_5$) ppm. IR (NaCl plates, Nujol mull, cm$^{-1}$): 3583 (w), 1568 (s), 1297 (m), 1087 (m), 790 (s), 741 (w), 698 (m). Anal. found (calcd. for C$_{39}$H$_{48}$N$_2$Ti): C, 79.1 (79.0); H, 8.1 (8.2); N, 4.8 (4.7) %. EI-MS m/z: 592 (5%, [M]$^+$), 386 (20%, [M-1,4-C$_4$H$_4$Ph$_2$]$^+$), 223 (65%, [M-1,4-C$_4$H$_4$Ph$_2$-Ph-2$^i$Pr]$^+$), 100 (30%, [N$^i$Pr$_2$]$^+$). Single crystals suitable for X-ray diffraction analysis were grown from a pentane solution at −30° C.

Cp*Ti{NC(Ph)N$^i$Pr$_2$}(η-1,4-C$_4$H$_4$Me$_2$) (Compound 3)

To a stirring solution of Cp*Ti{NC(Ph)N$^i$Pr$_2$}Cl$_2$ (0.80 g, 1.75 mmol) and 1,4-dimethyl-1,3-butadiene (0.57 g, 7.00 mmol) in toluene (30 mL) at 0° C. was added dropwise two equivalents of $^n$BuLi (2.2 mL, 1.6M in hexane, 3.50 mmol) which resulted in the solution changing colour from red to dark purple. The reaction mixture was allowed to warm slowly to room temperature and was refluxed at 90° C. for 8 h after which time the reaction mixture had turned dark green. Removal of the volatiles in vacuo afforded a green solid which was extracted into pentane (3×20 mL). After filtration, the pentane solution was concentrated to 20 mL and was cooled to 80° C. yielding green crystals which were isolated and washed with very cold pentane (5 mL) to give 6 (0.31 g, 38%). $^1$H NMR (Toluene-d$_8$, 299.9 MHz, 253 K): 7.18-6.85 (5H, series of overlapping multiplets, C$_6$H$_5$), 5.84 (1H, m, η-1,4-C$_4$H$_4$Me$_2$(vinylic)), 5.55 (1H, m, η-1,4-C$_4$H$_4$Me$_2$(vinylic)), 3.42 (2H, br s, CHMe$_2$), 1.99 (3H, d, η-1,4-C$_4$H$_4$Me$_2$), 1.68 (15H, s, C$_5$Me$_5$), 1.70 (3H, d, η-1,4-C$_4$H$_4$Me$_2$), 0.97 (12H, br s, CHMe$_2$), 0.60 (1H, m, η-1,4-C$_4$H$_4$Me$_2$(adjacent to Ti)), 0.38 (1H, m, η-1,4-C$_4$H$_4$Me$_2$(adjacent to Ti)) ppm. (Peaks corresponding to minor isomer: 1.78 (s, C$_5$Me$_5$), 1.26 (br s, CHMe$_2$) ppm) $^{13}$C NMR (Toluene-d$_8$, 233 K): 161.2 (NC(Ph)N$^i$Pr$_2$), 143.6 (i-C$_6$H$_5$), 130.0 (o- or m-C$_6$H$_5$), 129.4 (p-C$_6$H$_5$), 127.2 (m- or o-C$_6$H$_5$), 125.8 (i-1,4-C$_4$H$_4$Me$_2$ (adjacent to Ti)), 117.0 (C$_5$Me$_5$), 51.8 (CHMe$_2$), 46.3 (CHMe$_2$), 35.6 (η-1,4-C$_4$H$_4$Me$_2$ (vinylic)), 23.1 (η-1,4-C$_4$H$_4$Me$_2$), 19.7 (CHMe$_2$), 11.1 (C$_5$Me$_5$) ppm. IR (NaCl plates, Nujol mull, cm$^{-1}$): 3583 (w), 1593 (s), 1302 (m), 1282 (m), 1208 (w), 1158 (m), 1084 (w), 917 (w), 881 (w), 814 (m), 841 (w), 783 (m), 701 (m), 657 (w). Anal. found (calcd. for C$_{29}$H$_{44}$N$_2$Ti): C, 74.4 (74.3); H, 9.3 (9.5); N, 5.8 (6.0)%. EI-MS m/z: 468 (5%, [M]$^+$), 386 (20%, [M-1,4-C$_4$H$_4$Me$_2$]$^+$), 223 (35%, [M-1,4-C$_4$H$_4$Me$_2$-Ph-2$^i$Pr]$^+$), 100 (60%, [N$^i$Pr$_2$]$^+$).

Part II: Polymerization Reactions
General Polymerization Procedure

Methylaluminoxane was purchased from Crompton as a 10 wt. % Aluminium solution in toluene and was dosed as a 0.1 M Aluminium solution in toluene. Isobutylaluminoxane (IBAO-65, 13 wt. % hexanes solution was purchased from Akzo Nobel and was dosed to the reactor as 0.1 M Aluminium solution in toluene. 4-methyl-2,6-di-tert-butylphenol (BHT, +99.0%) was purchased from Sigma-Aldrich and dosed as a 0.2 M solution in hexanes. The catalyst precursor solutions as indicated in Table 1, 2 and 3 were dosed as 1.0 mM solutions in toluene. TBF20 (trityl tetrakis (pentafluorophenyl)borate) or BF15 (tris(pentafluorophenyl)borane) were dosed as 2.0 mM solutions in toluene. The feed streams (ethylene, propylene, hexanes, 2,2,4,6,6-Pentamethylheptane (PMH), hydrogen) were purified by contacting with various absorption media to remove catalyst killing impurities such as water, oxygen and polar compounds. (Molsieves 4 Å (Merck, nitrogen, ethylene, hydrogen), Molsieves 13-X (Merck, propene, PMH), Cu-catalyst BTS R311 (BASF, nitrogen, ethylene, propylene). In addition the solvents we stripped with nitrogen. 5-Ethylidene-2-norbornene (ENB) and 5-vinyl-2-norbornene (VNB) were purchased from Ineos and dosed to the reactor after stripping with nitrogen. The total aluminium concentration in the reactor was kept around 450 μmol/L to ensure efficient scavenging.

Ethylene Propylene ENB VNB batch quaterpolymerization reactions were carried out in a 2-liter autoclave equipped with a double intermig stirrer and baffles. The reaction temperature was set on 90° C. and regulated by a Lauda Thermostat. During the polymerization the ethylene and propylene monomers and 0.35 NL/h of hydrogen were continuously fed to the gas cap of the reactor. The pressure of the reactor was kept constant by a back-pressure valve.

In an inert atmosphere of nitrogen (1.8 bar), the reactor was filled with 950 ml of PMH solvent, and optionally 0.7 mL of ENB and 0.7 mL of VNB. Either methylaluminoxane and BHT, or isobutylaluminoxane was added as scavenger components. The reactor was heated to 90° C., while stirring at 1350 rpm. The reactor was pressurized to 8 bar by feeding ethylene, propylene. The reactor was conditioned applying a fixed ratio of ethylene and propylene for 15 minutes. Then, the catalyst compound was added to the reactor and the catalyst vessel was rinsed with an additional 50 mL PMH. When TBF20 or BF15 was used it was added directly after the catalyst precursor. After 10 minutes of polymerisation time, the monomer flow was stopped, and the solution was carefully dumped in a 2 L Erlenmeyer flask, containing a solution of Irganox-1076 in isopropanol and dried over night at 100° C. under reduced pressure (<20 mbar). The polymers were analyzed for intrinsic viscosity (IV), for molecular weight distribution (SEC-DV) and composition (FT-IR).

TABLE 1

MAO activated, MAO/BHT scavenger

| Example Nr. | Catalyst Component | Catalyst Loading (μmol) | Al/Ti (molar ratio) | BHT/Al (molar ratio) | Yield (g) | C2 (wt %) | ENB (wt %) | VNB (wt %) | Productivity (ppm Ti) |
|---|---|---|---|---|---|---|---|---|---|
| 1 | Compound 1 | 0.14 | 3214 | 2 | 9.4 | 51 | 1.1 | 0.8 | 0.7 |
| 2 | Compound 2 | 0.14 | 3214 | 2 | 4.6 | 51 | 1.1 | 0.8 | 1.5 |
| 3 | Compound 3 | 0.14 | 3214 | 2 | 8.7 | 51 | 1.2 | 0.8 | 0.8 |

TABLE 2

TBF20 activated, IBAO-65 scavenger

| Example Nr. | Catalyst Component | Catalyst Loading (μmol) | B/Ti (molar ratio) | Yield (g) | C2 (wt %) | ENB (wt %) | VNB (wt %) | Productivity (ppm Ti) |
|---|---|---|---|---|---|---|---|---|
| 4 | Compound 1 | 0.14 | 2 | 8.6 | 54 | 1.1 | 0.7 | 0.8 |
| 5 | Compound 2 | 0.14 | 2 | 6.1 | 54 | 1.1 | 0.7 | 1.1 |
| 6 | Compound 3 | 0.14 | 2 | 10.0 | 54 | 1.0 | 0.7 | 0.7 |

TABLE 3

BF15 activated, IBAO-65 scavenger.

| Example Nr. | Catalyst Component | Catalyst Loading (μmol) | B/Ti (molar ratio) | Yield (g) | C2 (wt %) | ENB (wt %) | VNB (wt %) | Productivity (ppm Ti) |
|---|---|---|---|---|---|---|---|---|
| 7 | Compound 1 | 0.14 | 2 | 4.05 | 53 | 1.0 | 0.7 | 1.7 |
| 8 | Compound 1 | 0.14 | 5 | 3.95 | 53 | 1.1 | 0.8 | 1.7 |
| 9 | Compound 2 | 0.14 | 2 | 0.7 | Nd | Nd | Nd | 9.1 |
| 10 | Compound 2 | 0.14 | 5 | 0.8 | Nd | Nd | Nd | 8.5 |
| 11 | Compound 3 | 0.14 | 2 | 10.3 | 53 | 1.0 | 0.7 | 0.7 |
| 12 | Compound 3 | 0.14 | 5 | 13.0 | 52 | 1.0 | 0.7 | 0.5 |
| 13 | Compound 3 | 0.14 | 10 | 13.4 | 52 | 1.0 | 0.7 | 0.5 |

The invention claimed is:

1. A catalyst system for the polymerization of olefins comprising
    (a) a metal complex of formula CyLMD, wherein
        M is titanium,
        Cy is a cyclopentadienyl-type ligand,
        L is an imine ligand,
        D is a conjugated diene, and
    (b) an activating cocatalyst,
    wherein the metal complex is characterized in that L is an amidinate-containing ligand of formula 1:

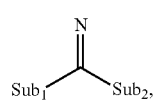

(formula 1)

wherein the amidinate-containing ligand is covalently bonded to the titanium via the imine nitrogen atom, $Sub_1$ is a substituent, which comprises a group 14 atom through which $Sub_1$ is bonded to the imine carbon atom, $Sub_2$ is a substituent of the general formula —$NR^4R^5$ which comprises a nitrogen atom through which $Sub_2$ is bonded to the imine carbon atom, $R^4$ and $R^5$ independently comprise a hydrocarbyl, and Cy is a mono- or polysubstituted cyclopentadienyl-type ligand, wherein the one or more substituents of Cy are selected from the group consisting of halogen, hydrocarbyl, silyl and germyl residues, optionally substituted with one or more halogen, amido, phosphido, alkoxy, or aryloxy residues.

2. Catalyst system according to claim 1, wherein the diene is a $C_{4-40}$ diene optionally substituted with one or more groups independently selected from the group consisting of hydrocarbyl, silyl, and halogenated carbyl.

3. Catalyst system according to any of the claims 1 and 2, wherein the activating cocatalyst is selected from the group consisting of borate, borane, or alkylaluminoxane.

4. Catalyst system according to claim 3, wherein the activating cocatalyst is a borane represented by the general formula $BR^1R^2R^3$, wherein B is a boron atom in the trivalent valence state and $R^1$, $R^2$ and $R^3$ are individually selected from the group of halogen atom, hydrocarbyl, halogenated hydrocarbyl, substituted silyl, alkoxy or di substituted amino residue.

5. Catalyst system according to claim 1, wherein the group 14 atom through which $Sub_1$ is bonded to the imine carbon atom is an aromatic carbon atom.

6. Catalyst system according to claim 1, wherein the group 14 atom through which $Sub_1$ is bonded to the imine carbon atom is an aliphatic carbon atom.

7. Catalyst system according to claim 1, wherein $R^4$ and $R^5$ are individually selected from the group consisting of aliphatic hydrocarbonyl, or halogenated aliphatic hydrocarbonyl, or aromatic hydrocarbonyl, or halogenated or aromatic hydrocarbonyl residues, and $R^4$ optionally forms a heterocyclic structure with $R^5$ or $Sub_1$.

8. A process for the preparation of a polymer comprising at least one aliphatic or aromatic hydrocarbyl $C_{2-20}$ olefin characterized in that the at least one aliphatic or aromatic olefin is contacted with the catalyst system according to claim 1.

9. Process according to claim 8, wherein the polymer is EPDM.

* * * * *